United States Patent
Ryan

[15] 3,678,133
[45] July 18, 1972

[54] MODIFIED VINYL HALIDE POLYMERS

[72] Inventor: Charles Francis Ryan, Warminster, Pa.

[73] Assignee: Rohm and Haas Company, Philadelphia, Pa.

[22] Filed: April 24, 1970

[21] Appl. No.: 31,754

[52] U.S. Cl..............260/876 R, 260/23 XA, 260/31.8 M, 260/41 A, 260/41 B, 260/41 C, 260/41 AG, 260/873, 260/878 R, 260/881, 260/883, 260/884, 260/885 R

[51] Int. Cl.......................C08f 37/18, C08f 41/12

[58] Field of Search....................260/876 R, 885

[56] References Cited

UNITED STATES PATENTS

| | | | |
|---|---|---|---|
| 3,041,308 | 6/1962 | Baer | 260/876 |
| 3,041,309 | 6/1962 | Baer | 260/876 |
| 3,287,444 | 11/1966 | Ennor et al. | 260/885 |
| 3,426,101 | 2/1969 | Ryan et al. | 260/876 |

FOREIGN PATENTS OR APPLICATIONS

| | | | |
|---|---|---|---|
| 1,117,124 | 6/1968 | Great Britain | 260/885 |

*Primary Examiner*—Paul Lieberman
*Assistant Examiner*—Helen W. Roberts
*Attorney*—George W. F. Simmons and Thomas A. Lennox

[57] ABSTRACT

Superior impact modified vinyl halide polymers with exceptional low die swell characteristics are attained by a modifier composition which does not contribute to the instability of the vinyl halide polymers. The modified polymers are readily extrudable, even into complex and delicate shapes, at moderate conditions and in simple equipment. The modifier composition is a multiphase acrylic composite interpolymer having a first cross-linked acrylic elastomer phase, and a second, acrylic ridig thermoplastic phase polymerized onto the elastomer, having a molecular weight in the range of from about 50,000 to 600,000.

24 Claims, No Drawings

MODIFIED VINYL HALIDE POLYMERS

Vinyl halide polymers are a class of materials well known in the art, and are widely used for their excellent balance of physical properties, economy, availability, and, to a certain extent, because of a lack of suitable substitutes. Included are homopolymers and copolymers of vinyl halides generally, and particularly the polymers and copolymers of vinyl chloride. The copolymers contemplated in the art by the expression vinyl halide copolymers typically comprise the polymers resulting from the polymerization of a monomer mixture comprising at least 80 percent by weight of a polyvinyl halide with up to about 20 percent by weight of another monovinylidene compound copolymerizable therewith, such as vinyl acetate, methyl methacrylate, styrene or the like.

Unmodified polyvinyl halide homopolymers and copolymers have several detrimental limitations. Since polyvinyl chloride (PVC) and other vinyl halide polymers have relatively poor heat stability, there are strict limitations on the processing temperatures for these polymers. Under such processing conditions, PVC has poor flow characteristics and satisfactory extrusion and molding often cannot be achieved. The end product produced under such conditions often has poor surface quality and has a burnt or scorched appearance. An additional deficiency, not specifically related to processing techniques, is the generally insufficient impact resistance for numerous desirable uses of the vinyl halide polymers.

A wide variety of materials have been compounded with vinyl halide polymers in attempts to improve upon one or more of the deficient characteristics. In particular, it has been common to admix rubber or rubber like materials, such as polymers, copolymers, or graft copolymers of butadiene, with polyvinyl halide polymers and copolymers to attain ease of processing and improvement of the impact resistance. Such materials are, however, extremely susceptible to both thermal and ultraviolet light instability, resulting in oxidative degradation and discoloration. The instability of such materials has been attributed largely to the level of unsaturation, and the activity of such unsaturation during the life of a molded product.

In attempts to improve the above deficiencies observed with unsaturated rubbers, fully saturated acrylic polymers and copolymers have been used as impact modifiers for polyvinyl halide polymers. When these acrylic impact modified compositions are processed, high die-swell is frequently encountered such that fabricated objects with intricate profiles and shapes are difficult to produce with sufficient control of the dimensions. It is not economical nor desirable to design a new die for every compound and every degree of die-swell encountered. It is necessary to design the die to conform as closely as possible to the final shape desired, and there is great need for a compound with the advantages of the acrylic modified materials but with low die-swell.

Improved processing characteristics have been obtained by grafting on the surface of the acrylic elastomer a rigid acrylic polymer that is compatible with the polyvinyl halide polymer. The placing of this rigid phase on the elastomer provides substantial improvements in the processing characteristics and the impact strength of the modified polyvinyl halide but tends to yield high die-swell upon extrusion of the molding compound.

It is, accordingly, an object of the present invention to provide stable, impact resistant vinyl halide compositions with improved processing characteristics and low die swell properties. It is a further object of the present invention to provide extrusion compounds of vinyl halide polymers having a combination of properties heretofore believed to be mutually exclusive, i.e. excellent stability and impact resistance together with low temperature, low pressure forming characteristics with no or extremely little die swelling. The present invention realizes the foregoing objects, and still others to become apparent herein, and reduces or eliminates the deficiencies of the compositions of the prior art.

The present invention comprises a novel acrylic-based composite interpolymer material having a first, elastomeric phase and a second, rigid thermoplastic phase, wherein the molecular weight of the rigid phase is from about 50,000 to 600,000, and blends thereof with vinyl halide homopolymers and copolymers. The composite interpolymer material effectively increases the impact resistance of vinyl halide homopolymers and copolymers, and has a very low susceptibility to thermal or ultraviolet light stimulated instability, and serves to render the polymers readily extrudable at moderate temperatures and pressures with no or little die swelling of the extrudate.

The composite interpolymer of the present invention comprises a multi-phase acrylic base material comprising a first, elastomeric phase polymerized from a monomer mix comprising at least about 50 weight per cent of an alkyl acrylate having about two to eight carbon atoms in the alkyl group and a minor amount of a cross-linking agent, and a second, rigid thermoplastic phase polymerized from a monomer mix comprising at least about 50 weight per cent alkyl methacrylate having one to four carbon atoms in the alkyl group, and having a molecular weight of from about 50,000 to 600,000.

The composite interpolymer material is ordinarily and preferably prepared by emulsion polymerization of the elastomer as a discrete phase from a monomer mix of at least about 50 weight per cent of an alkyl acrylate and about 0.05 to 5.0, preferably 0.1 to 3.5, weight per cent of a cross-linking agent. Upon completion of the polymerization of the elastomeric phase, i.e., substantial exhaustion of the monomers in the initial polymerization mix, the rigid thermoplastic phase is then formed by polymerization in the presence of the elastomer, in the same emulsion, and preferably with minimal penetration or swelling of the elastomer phase, from a monomer mix comprising at least about 50 weight per cent $C_1$ to $C_4$ alkyl methacrylate. The polymerization of the rigid thermoplastic phase of the composite is preferably conducted in such a fashion that substantially all of the rigid phase material is formed on or near the surface of the elastomeric phase as hereinafter more fully described, and without the formation of substantial numbers of new particles in the emulsion.

The acrylic elastomer phase of the composite interpolymers of the present invention comprises at least 50 per cent of alkyl acrylate units. The alkyl esters of acrylic acid having alkyl groups of two to eight carbon atoms, and preferably four carbon atoms, are contemplated. Longer chain alkyl groups can be used, although substantial difficulties in the polymerization can result, and such monomers are not preferred inclusions.

Other acrylic monomer, including acrylonitrile, methacrylonitrile, alkylthioalkyl acrylates such as ethylthioethyl acrylate, and the like, alkoxyalkyl such as methoxyethyl acrylate, and the like, also can be used in proportions ranging up to about 49.95 weight per cent. Interpolymers of these acrylates can further include up to about 20 weight per cent of other non-acrylic copolymerizable monomers, such as styrene, alkyl methacrylates, olefins, vinyl ethers, amides and esters, vinyl and vinylidene halides, and the like.

Another inclusion in the acrylic elastomer includes polyfunctional monomers capable of forming a cross-linked elastomer, such as polyethylenically unsaturated monomers like polyacrylates and polymethacrylates, divinyl benzene, and monomers capable of ionic and coordinate cross-linking such as acid groups and organic and inorganic bases and other electron donating groups coordinating with suitable electorophilic agents. The resulting cross-linked elastomers are referred to as gelled polymers to describe that physical characteristic of the polymers. The polyethylenically unsaturated monomers include polyacrylic and polymethacrylic esters of polyols, such as 1,3-butylene diacrylate and dimethacrylate, trimethylol propane trimethacrylate and the like, di-and tri-vinyl benzene, vinyl acrylate and methacrylate, and other common cross-linking monomers. These cross-linking monomers can be generally characterized, for purposes of the present invention, as compounds having at least two polymerizable ethylenically unsaturated reactive groups which are non-conjugated or, if conjugated, mediately conjugated. Mediate conjugation results when the reactive groups are conjugated with and/or through an intermediate, non-polymerizable unsaturated group. For example, the two vinyl groups of divinyl benzene are not conjugated with each other except by virtue of the "mediating" effect of the aromatic unsaturation. Likewise, the polymerizable unsaturation of vinyl acrylate is conjugated only through the mediation of the carbonyl unsaturation. The polymerizable groups of butadiene, on the contrary, are directly conjugated, and is accordingly not within the scope of the presently contemplating cross-linking monomers. Use of directly conjugated materials such as butadiene and the like results in failure to attain the benefits of the present invention.

Preferred elastomers within the scope of the present invention include acrylic interpolymers prepared from monomer mixtures comprising about 50 to 99.95 parts by weight alkyl acrylate monomers, wherein the alkyl group contains one to eight carbon atoms, about 5 to 30 parts by weight other acrylic monomers, about 0 to 20 parts by weight of other non-acrylic ethylenically unsaturated monomers and about 0.05 to 5, preferably 0.1 to 3.5 parts by weight of a polyunsaturated non-conjugated or mediately conjugated cross-linking monomer.

In the preparation of the elastomeric phase, it will ordinarily be preferred to choose monomer systems and proportions so as to effect control the the glass transition temperature, ($T_g$), of the phase. The $T_g$ of the elastomeric phase should be, in most situations, below about 10° C, and preferably below about 0° C. In most preferred formulations, $T_g$ should be below about −30°C.

The rigid thermoplastic phase of the composite interpolymer of the present invention includes the acrylic thermoplastics polymerized from monomer mixtures comprising 40 to 100 weight per cent alkyl methacrylate, wherein the alkyl group has one to four carbon atoms, one or more acrylic comonomers in quantities of 0 to 60 weight per cent such as other alkyl and aryl methacrylates, alkyl and aryl acrylamides, substituted alkyl and aryl acrylic and methacrylic monomers, wherein the substitutents can be halogen, alkoxy, alkylthio, cyanoalkyl, amino, alkylthio, and other like substituents, 0 to 60 weight per cent non-acrylic unsaturated monomers which impart rigid character to the rigid phase, such as vinyl aromatics, preferably styrene and α-methylstyrene, vinyl and vinylidene halides, and vinyl-substituted nitriles, and 0 to 10 weight per cent of still other nonacrylic unsaturated monomers, including vinyl esters, vinyl ethers, vinyl amides, vinyl ketones, olefins, and the like. To obtain higher service temperatures, cycloalkyl esters of methacrylate acid are useful wherein the cyclic portion contains five, six, or seven carbon atoms, with or without an additional alkyl bridge, the alkyl portion of the cycloalkyl group containing up to 10 carbon atoms, such as isobornyl methacrylate.

The rigid phase is further characterized by molecular weight ranging from about 50,000 to 600,000, preferably 50,000 to 500,000, and still more preferably 50,000 to 300,000. A particularly effective molecular weight for attaining the full benefits of the present invention is about 100,000 to 250,000, which level is also relatively convenient to attain in preparing the composite interpolymers of the present invention. Unless otherwise noted the term "molecular weight" refers to viscosity average molecular weight ($\overline{M}_v$).

In the preparation of the rigid thermoplastic phase, it will often be desirable to obtain a glass transition temperature, ($T_g$), above at least about 20° C, and preferably above about 50° C. In most preferred formulations, $T_g$ of the rigid phase should be above about 90°C.

The composite acrylic interpolymers of the present invention are prepared in suspension or emulsion polymerization procedures utilizing a multi-stage or sequential technique. In simplest form, the elastomeric phase is formed in an initial stage and the rigid thermoplastic phase is formed in a second stage. Either the elastomeric or rigid phases can themselves also be sequentially polymerized. The monomers of the initial stage, together with polymerization initiators, soap or emulsifiers, polymerization modifiers and chain transfer agents and the like are formed into the initial polymerization mix and polymerized, e.g. by heating and mixing the emulsion, in well known and wholly conventional fashion, until the monomers are substantially depleted and a seed polymer is formed. Monomers of the second, and in turn, of each additional stage are then added with appropriate other materials e.g. supplementary initiators, soap, modifiers, and the like, so that the desired polymerization of each stage occurs in sequence to substantial exhaustion of the monomers. In each stage subsequent to the first, the amounts of the initiator and soap, if any, are maintained at a level such the polymerization occurs at or near the surface of the existing particles, and no substantial number of new particles, or seeds, form in the emulsion. When the two phases of the composite interpolymer are either themselves formed by sequential polymerization, the monomer constituents of the various stages of each phase may vary from stage to stage, or all the components can be present throughout the entire phase polymerization. The stages can vary in hardness, from a very soft elastomer first stage seed to the hardest rigid thermoplastic. Both the elastomer and rigid thermoplastic can contain chain transfer agents, in one or all stages, and any or all stages of the composite can contain polyfunctional cross-linking monomers. The molecular weight of the hard phase might be controlled by modification of either the hard phase itself with chain transfer agents or it might be controlled by providing sites on the elastomer particles that act as chain transfer agents in the hard phase. These techniques include any type of chain transfer agents in the elastomeric phase and specifically include pendant mercaptan groups and di-functional monomers such as polyunsaturated monomers which by the difference in the reactivity between the functional groups cause functional groups such as unsaturation to remain in the elastomer which will act as claim transfer agents in the latter hard phase.

The polymerization reactions can be initiated by either thermal or redox type initiator systems. Examples of thermal initiators include the organic peroxides, such as benzoyl peroxide, substituted benzoyl peroxides, acetyl peroxides, lauroyl peroxide, t-butyl hydroperoxide, di-t-butyl hydroperoxide, peresters, such as t-butyl peroxypivilate, axo-type initiators such as azo-bis-isobutyronitrile, persulfates, such as sodium, potassium or ammonium persulfate, and peroxyphosphates such as sodium, potassium, or ammonium peroxyphosphate. Redox initiators are generally a combination of a hydroperoxide, such as hydrogen peroxide, t-butyl-hydroperoxide, cumene hydroperoxide, diisopropylbenzene hydroperoxide, and the like, with a reducing agent, such as a sodium, potassium, or ammonium bisulfite, metabisulfite, or hydrosulfite, sulfur dioxide, hydrazine, ferrous salts, ascorbic acid, sodium formaldehyde sulfoxylate and the like, as are well known in the art. In the utilization of emulsion polymerization techniques, it is preferred that a oil soluble initiator system be utilized in preference to water soluble initiator systems.

Examples of emulsifiers or soaps suited to polymerization processes of the present invention include alkali metal and ammonium salts of alkyl, aryl, alkaryl, and aralkyl sulfonates, sulfates and polyether sulfates, ethoxylated fatty acids, esters, alcohols, amines, amides, alkyl phenols, complex organophosphoric acids and their alkali metal and ammonium salts.

Chain transfer agents are ordinarily desirable in the polymerization mix for the control of the molecular weight of the rigid thermoplastic phase. The art is well aware of numerous techniques for the control of molecular weight, and there is no criticality in the present invention in any particular technique. A preferred technique, however, is the inclusion of a lower alkyl mercaptan, such as sec-butyl mercaptan, in the polymerization mix during the stage or stages when the rigid phase is polymerized. It has been noted that higher normal alkyl mercaptans, i.e., $C_{10}$ to $C_{12}$ are not effective in reasonable amounts and should ordinarily not be used. In particular, it was noted that n-dodecyl mercaptan was ineffective for attaining the molecular weight range required in the present invention without substantial contamination of the product with residual mercaptan. Other techniques for controlling molecular weight of the rigid phase include the presence of relatively large amounts of peroxide and operations at high temperature, and the presence of allyl compounds.

The composite interpolymer of the present invention is comprised of the two discrete phases. Because of the extreme complexity of the interrelations among the various ingredients, it is difficult to isolate and describe the physical characteristics of the component phases. Because of the degree of cross-linking in the elastomer phase no adequate or meaningful determination of molecular weight can be ascertained for the elastomeric phase. Extraction of the composite interpolymer permits determination of the rigid phase, which will have a measurable molecular weight of from about 50,000 up to as much as 600,000. The elastomer portion has been ascertained to have a swelling ratio (weight of wet, acetone extracted, insoluble gel/weight of dry, acetone extracted gel) ranging from about 2 to 12.

The relative proportions of the elastomeric and harder thermoplastic phases can vary considerably, but will ordinarily be in the range of about 40 – 90 weight per cent elastomer and conversely about 20 – 60 weight per cent thermoplastic, preferably on the order of about 50-80 weight per cent elastomer and about 20-50 weight per cent rigid thermoplastic.

It is preferred that the polymerization conditions be maintained such that the rigid phase is polymerized at or near the surface of the elastomer phase, and preferably in a discrete layer which encapsulates the elastomer and with minimized penetration and swelling of the elastomer of the rigid phase monomers. The encapsulation is not narrowly important, however, and often entirely satisfactory results are attained when the rigid phase covers only a portion of the surface of the elastomer, but it has been noted that when too large a proportion of the volume of the elastomer is penetrated and swelled by the rigid phase monomers, the impact properties and processing characteristics of the blends of the composite interpolymer with the vinyl halide polymers are detrimentally affected.

By control of the polymerization variables, it is possible to control the particle size of this composite interpolymer, in a fashion well-known to the art. The particle size is not of narrow significance to the present invention; it can range from as low as about 500 angstroms, or even less, up to as large as about 3,000 angstroms or even more. In certain circumstances, however, more narrow particle size ranges can be of significance. For example, it is preferable to utilize particles as large as possible, consistent with the effective and economical preparation of the material. In the manufacture of composites for the preparation of extruded shapes, it is accordingly preferred that the particle diameters range from about 1,500 to 2,500 angstroms, more preferably 1,600 to 2,300 angstroms.

The amount of the composite interpolymer to be blended with a polyvinyl halide varies widely, depending upon the character of the interpolymer, the character of the vinyl halide polymer, and the physical characteristics desired in the final product. It is generally desirable to include at least 2 weight per cent of the interpolymer in an extrusion composition to provide significant and commercially important improvements in the processing and physical characteristics. As the interpolymer concentration is increased past about 50 weight per cent, the physical characteristics of the combination are adversely affected and the composition will ordinarily no longer be considered useful as a vinyl halide polymer extrusion composition. The physical characteristics adversely affected at the higher interpolymer concentrations include modulus, turbitity, hardness, and shrinkage at high surface temperatures. Thus, the interpolymer content of such blends will ordinarily range from about 2 to 50 per cent by weight of the total extrusion formulation, and more preferably about 3 to 30 weight per cent, and most preferably 5 to 20 weight per cent.

The thermoplastic vinyl halide polymers utilized in the present invention are the polymers and copolymers of vinyl halides, preferably chlorides, widely utilized in the production of plastic articles. These polymers are referred to as vinyl halide or vinyl chloride polymers in the present invention, and for most all uses must be modified, compounded or copolymerized with other materials to provide processable and useful compositions. For the purpose and scope of this specification the term "vinyl chloride polymers" or compositions will include all compositions which have vinyl chloride or other halide as the major (greater than 50 percent) component monomer. The compositions include, but are not limited to: poly(vinyl chloride) [PVC], copolymers of vinyl chloride with other monomers that include vinyl alkanoates such as vinyl acetate and the like, vinylidene halides such as vinylidene chloride, alkyl esters of carboxylic acids such as acrylic acid, ethyl acrylate, 2-ethylhexyl acrylate and the like, unsaturated hydrocarbons such as ethylene, propylene, isobutylene and the like, allyl compounds such as allyl acetate and the like; for flexibility vinyl halide polymers are often compounded with plasticizers such as dioctyl phthalate, poly(propylene adipate) and the like, and other modifiers such as chlorinated polyethylene; and many other materials are often included. The molecular weight and molecular weight distribution of the polymers is not critical to the aims, purposes and results of using this invention. For general applications vinyl chloride polymers with Fikentscher K-values in the range of 40 to 95, preferably about 50 to 75, are generally used. The Fikentscher K-value is determined by the formula $$\frac{\log\,[\eta]_{rel}}{C} = \frac{75 \times 10^{-6} K^2}{1 + 1.5 \times 10^{-3} KC} + 10^{-3} K$$

where C is 0.5 gm/100 ml concentration of polymer in solvent,
$[\eta]$ rel is relative viscosity in cyclohexanone at 25°C. and
K is Fikentscher value.

When copolymers of vinyl chloride are utilized in the practice of the present invention, it is usually preferable to utilize a polymer containing from 0 to 15 weight per cent of comonomer. The preferred comonomer is preferably the vinyl alkanoate, and is most preferably vinyl acetate. The most preferable copolymer contains up to 10 weight per cent of the comonomer, with the remainder being vinyl chloride.

The copolymers of vinyl chloride and another monomer, mentioned above, are often softer than homopolymers of vinyl chloride.

Finally, the most preferred polymer, and the polymer which is most effectively modified by the composite interpolymers of the present invention is the homopolymer of vinyl chloride.

The above copolymers vary in physical characteristics such as viscosity, and molecular weight. The copolymers generally are of slightly lower molecular weights than PVC. Also, the viscosity values are often slightly lower, although generally within the above range. These differences however, are not limiting to the present invention which is directed to modifying such polymers and not the polymers themselves. The polymers, however, as is obvious, must be suitable for the use desired when modified, and physically must be of a type to which the present modifiers can be added.

Blends of the composite interpolymer and the vinyl halide polymer can be accomplished by any convenient technique. Entirely satisfactory blends can be accomplished on a roll mill at convenient and customary operating conditions, such as about 350° F. in about 5 to 15 minutes time. Dry mixing techniques, as with a mechanical mixer-blender device, can also be employed. The powder blends can, if desired, be processed in commercial extrusion equipment at conditions varying with the molecular weight of the polyvinyl halide used and the equipment employed for that purpose.

Certain processing aids, stabilizers, and the like are often incorporated in the blends. The stabilizers which serve to prevent the breakdown of the polyvinyl halide, are of several different types, including both varieties which stabilize against thermal and ultraviolet light stimulated oxidative degradation, discoloration, and the like.

Other inclusions of the blends prepared in accordance with the present invention include lubricants, such as stearic acid, stearyl alcohol, eicosanol, and other known types; colorants, including organic dyes, such as anthraquinone red, and the like, organic pigments and lakes such as phthalocyanine blue and the like, and inorganic pigments such as titanium dioxide, cadmium sulfide, and the like; fillers and particulate extenders such as carbon black, amorphous silica, asbestos, glass fibers, magnesium carbonate, and the like; plasticizers such as dioctyl phthalate, dibenzyl phthalate, butyl benzyl phthalate, hydrocarbon oils, and the like.

While only a few of such materials have been specifically recited, it is not intended to exclude others; the recitation is exemplary only, and each category of additives is common and well-known in the art, including extremely large numbers of materials which are equally well suited for inclusion in the materials of the present invention.

Such inclusions can be made at any stage of preparation in accordance with accepted techniques well-known to those ordinarily skilled in the art, in proportions which are commonly employed. Such additional materials are not of particular significance in the present invention and form no part thereof.

The blended compositions prepared in accordance with the present invention are tough, rigid, thermoplastic, chemically resistant materials having high impact strength, high heat distortion temperatures, excellent stability characteristics, and are easily processed in conventional extrusion apparatus with little or no di-swell. They are particularly useful in forming plastic pipes and extruded products of similar nature.

A summation of the foregoing considerations can be made, wherein the multiphase acrylic composite interpolymer of the present invention is generally constituted of a first, elastomeric phase having a $T_g$ of not greater than about 10° C, emulsion polymerized from at least about 50 weight per cent lower alkyl acrylate, 0.05 to 5 weight per cent unsaturated cross-linking monomer, 0 to 49.95 weight per cent other acrylic monomer, and 0 to 20 weight per cent other, non-acrylic, copolymerizable unsaturated monomer, and a final, rigid thermoplastic phase emulsion polymerized in the presence of said first phase from at least about 40 weight per cent lower alkyl methacrylates, up to about 60 weight per cent other acrylic comonomer, and up to about 60 weight per cent non-acrylic, ethylenically unsaturated comonomer, where the rigid phase has a molecular weight of from about 50,000 to about 600,000 and a $T_g$ of at least about 20° C.

To assist those skilled in the art in the practice of the present invention, the following modes of operation are set forth as illustrations, parts and percentages mean by weight unless otherwise specifically noted:

EXAMPLE 1

A series of compositions are prepared to illustrate the composite interpolymers and blends thereof with vinyl halide polymers, and to illustrate the effects of molecular weight of the unattached rigid phase and attachment level between elastomer and rigid phases.

A Preparation of Composite Interpolymer

The composite interpolymers are prepared in accordance with the following procedure:

To a suitable reaction vessel there is added a charge of 400 parts deionized water, 10 parts of a 10 percent by weight aqueous solution of sodium lauryl sulfate, and 0.1 part glacial acetic acid. While the mixture is continuously stirred, 100 parts of the elastomer phase monomer charge is added and the reaction vessel is then purged with nitrogen for thirty minutes. Then 0.17 parts of cumene hydroperoxide is added and the mixture is heated to 40° C. There is then added at 3 minute intervals small increments of a dilute aqueous solution of sodium formaldehyde sulfoxylate until polymerization is initiated, as indicated by an exotherm. Ordinarily about 0.001 to 0.005 parts of the sulfoxylate is sufficient. The reaction is continued for at least one hour, or to substantial depletion of the monomers. The temperature of the system is then adjusted to 40° C and additional sodium formaldehyde sulfoxylate (about 0.05 parts) is added. The 100 parts of the rigid phase monomers, chain transfer agent, if any, e.g. ordinarily at least 0.1 part of sec-butyl mercaptan, and 0.15 parts of cumene hydroperoxide are added in bulk. The reaction is allowed to exotherm over a period of about 1 hour to peak temperature and this temperature is maintained for an additional 30 minutes. The reaction mixture is then cooled to about ambient temperature and the polymer is isolated by spray drying.

Nine different composite interpolymers are prepared in accordance with the foregoing procedure, to produce the materials designated in Table I. In each of the runs, the composite is prepared to contain substantially 50 per cent elastomer and 50 per cent rigid phase; the elastomer phase is polymerized from a major amount of butyl acrylate and a minor amount, as designated in Table I, of 1,3-butylene diacrylate (BDA), while the rigid phase is polymerized from methyl methacrylate, with the designated level of sec-butyl mercaptan (Sec-BuSH) as the chain transfer agent.

A tenth composite was prepared, wherein the procedure was modified by adding the rigid phase monomers gradually, over a period of about 3 hours, at a temperature of about 40° to 45° C, and the reaction continued for an additional period of about 30 minutes after the completion of the monomer addition.

Die-swell is the phenomenon wherein the extruded part swells as it leaves the die lips changing the dimensions of the part to vary from that of the die shape. Zero die-swell would be obtained when all dimensions of the part are the same as that of the die. Zero die-swell is not actually obtained in practice, however extremely low die-swell is obtained wherein the approximate dimensions of the extruded part are retained to prevent any significant distortion and swelling. Although die-swell includes all forms of distortion, the per cent die-swell on Table I, for convenience, is calculated by the ratio of the thickness of a profile divided by the thickness of the die X 100.

TABLE I

| Run No. | First stage | | | | Second stage | | Modifier particle diameter, A[c] |
|---|---|---|---|---|---|---|---|
| | Particle diameter, A[a] | Percent BDA[b] | Percent gel[c] | Swelling index[c] | Sec.-BuSH | $\frac{1}{M_v} \times 10^{-5[d]}$ | |
| 1 | 1,153 | 0.1 | 90.5 | 9 | 0.00 | 30.0 | 1,387 |
| 2 | 1,194 | 1.0 | 97.6 | 3 | 0.00 | 26.0 | 1,422 |
| 3 | 1,196 | 3.0 | 98.1 | 2 | 0.00 | 20.0 | 1,425 |
| 4 | 1,109 | 0.1 | 90.5 | 9 | 0.05 | 6.0 | 1,412 |
| 5 | 1,181 | 1.0 | 97.0 | 3 | 0.05 | 5.4 | 1,400 |
| 6 | 1,157 | 3.0 | 96.7 | 2 | 0.05 | 6.0 | 1,383 |
| 7 | 1,119 | 0.1 | 90.4 | 9 | 0.10 | 4.0 | 1,343 |
| 8 | 1,144 | 1.0 | 97.4 | 3 | 0.10 | 2.9 | 1,363 |
| 9 | 1,159 | 3.0 | 97.0 | 2 | 0.10 | 4.0 | 1,379 |
| 10 | 1,108 | 3.0 | | | 0.10 | 1.95 | 1,858 |

[a] Determined by light scattering.
[b] Based on first stage.
[c] Determined in acetone.
[d] Determined by solution viscosity.

B. Blends of Composite Interpolymer and Polyvinyl Chloride:

Each of the composite interpolymers of Table I is blended with a polyvinyl chloride in the following procedure:

Blends are prepared containing 5 and 10 parts by weight of the composite and 95 and 90 parts by weight PVC, respectively, on a roll mill, together with 3 parts of a barium-cadmium stabilizer, 1.5 parts of a chelating agent, 8 parts TiO$_2$, and 1 part aluminum stearate. The compound is milled at 350° F. with a 40 mil roll separation for about 3 to 20 minutes, until blending is complete. The blended materials are then subjected to standard testing to determine their properties, which are reported in Table II.

The PVC utilized in the present Example had a Fikentscher Value K = 62.

phase is prepared from 99 per cent by weight n-butyl acrylate and 1 per cent by weight 1,3-butylene diacrylate. The rigid phase is provided in an amount corresponding to 100 parts per 100 parts of elastomer and it is polymerized from n-butyl methacrylate. The molecular weight of the rigid phase is controlled by the inclusion of 0.1 weight per cent, based on the rigid phase monomers, of sec-butyl mercaptan. When blended with polyvinyl chloride, the resultant composite interpolymer is found to impart high impact strength and low die-swell to the blend.

EXAMPLE 5

Again following the procedure described in Example 1, an elastomeric phase is provided by polymerizing 98.5 weight per

TABLE II

| | Modifier | | Izod impact of blends | | | | | 10% modifier | | | |
| | | | | | | | | Rheology | | Heat stability at 350° F. hours to | |
| Run number | Percent attachment[1] | $\bar{M}_v \times 10^{-5}$ | Modifier, per cent at 23° C. | | Test temperature for 10% modifier, ° C. | | | Poises | Percent die swell | Color | Char |
| | | | 10 | 5 | 15 | 10 | 0 | | | | |
| 1 | 27 | 30.0 | 19.3 | 19.3 | 12.0 | 3.2 | 1.9 | 6,607 | 43 | 1½ | 3 |
| 2 | 44 | 26.0 | 25.7 | 16.1 | 23.2 | 3.5 | 1.7 | 6,838 | 41 | 1½ | 3 |
| 3 | 54 | 20.0 | 30.2 | 13.2 | 20.9 | 3.8 | 2.1 | 6,992 | 32 | 1½ | 3 |
| 4 | 3 | 6.0 | 22.7 | 10.5 | 3.6 | 3.2 | 1.9 | 3,685 | 29 | 1½ | 3 |
| 5 | 5 | 5.4 | 23.8 | 17.5 | 13.2 | 2.0 | 2.1 | 5,849 | 32 | 1½ | 3 |
| 6 | 14 | 7.0 | 25.4 | 23.5 | 20.5 | 4.1 | 2.3 | 6,300 | 27 | 1½ | 3 |
| 7 | 2 | 4.0 | 21.5 | 16.5 | 6.7 | 2.9 | 2.1 | 5,532 | 22 | 1½ | 3 |
| 8 | 2 | 2.9 | 25.7 | 19.3 | 7.1 | 2.9 | 1.9 | 5,762 | 22 | 1½ | 3 |
| 9 | 9 | 4.0 | 16.7 | 13.3 | 15.0 | 3.7 | 2.9 | 6,223 | 20 | 1½ | 3 |
| 10 | 9.5 | 1.95 | 23.0 | 14.0 | 10.1 | 99.4 | 2.1 | 6,146 | 12 | 1½ | 3 |

[1] Amount of non-extractable hard polymer bound to elastomer divided by the total amount of said polymer × 100.

EXAMPLE 2

Utilizing the procedures of part (A) of Example 1, as modified for Run 10, i.e., with the gradual addition of the rigid phase monomer system under moderate polymerization conditions at about 40° – 45° C., a composite interpolymer is prepared wherein the elastomeric phase is polymerized from a monomer mix of 48.5 per cent by weight of 2-ethyl hexyl acrylate, 48.5 per cent by weight n-butyl acrylate, and 3 weight per cent of 1,3-butylene diacrylate. Onto 100 parts by weight of the elastomeric phase, there is polymerized 100 parts by weight of rigid hard phase polymerized from methyl methacrylate. The composite interpolymer is then blended with polyvinyl chloride, having a Fikentscher Value of 62, by the procedure of part (B) of Example 1. The blend is found to have excellent impact resistance, 6.9 ft. lbs. per inch at the 5 per cent modifier level, and was further found to have a die-swell upon extrusion of about 15 per cent. The molecular weight of the composite interpolymer rigid phase was found to be about 260,000 as determined by solution viscosity.

EXAMPLE 3

A composite interpolymer is prepared by the process described in Example 1, wherein 100 parts by weight of a rigid hard phase from a monomer mix of 90 weight per cent methyl methacrylate and 10 weight per cent ethyl acrylate in the presence of 0.1 weight per cent, based on the total weight of monomers, of sec-butyl mercaptan, is polymerized in the presence of 100 parts by weight of an elastomeric phase polymerized from a monomer mix containing 90 weight per cent n-butyl acrylate, 9 weight per cent styrene, and 1 per cent by weight of divinyl benzene cross-linking agent.

The resulting composite interpolymer is found to impart high impact strength and low die-swell properties to polyvinyl chloride when incorporated in the manner disclosed in Example 1, both at 5 per cent by weight and at about 35 per cent by weight modifier based on the total blended formulation.

EXAMPLE 4

A composite interpolymer, formed by the polymerization technique of Example 1 is formed wherein the elastomeric cent 2-ethyl hexyl acrylate, 1 per cent by weight 1,3-butylene diacrylate and 0.5 weight per cent diallyl maleate. Onto the elastomeric phase, there is polymerized 25 parts by weight, per 100 parts by weight of elastomer, of a rigid hard phase polymerized from equal parts by weight of methyl methacrylate and styrene in the presence of 0.25 weight per cent, based on the weight of the rigid phase monomers, of sec-butyl mercaptan, utilized to control the molecular weight of the rigid phase. The inclusion of diallyl maleate in the elastomeric phase also operates as a chain transfer agent during the polymerization of the rigid phase, as hereinbefore described. The composite interpolymer is found to impart excellent impact strength and low die-swell properties when incorporated into polyvinyl chloride.

EXAMPLE 6

Three additional composite interpolymers are formed by the technique Example 1, wherein 100 parts by weight of a rigid phase polymerized from methyl methacrylate in the presence of 0.1 weight per cent sec-butyl mercaptan or formed on the surface of 100 parts by weight each of three different elastomeric phases. The elastomeric phases are polymerized from first a monomer mixture of 47 per cent by weight ethyl acrylate, 50 per cent by weight n-butyl acrylate, and 3 weight per cent 1,3-butylene diacrylate; second a monomer mix comprising 10 weight per cent isobornyl acrylate, 87 weight per cent n-butyl acrylate, and 3 weight per cent 1,3-butylene diacrylate; and third 10 weight per cent styrene, 87 weight per cent n-butyl acrylate, and 3 weight per cent 1,3-butylene diacrylate. Each of the three composite interpolymers is blended in a polyvinyl chloride formulation, corresponding to that of Example 1, and the resultant blends are found to have increased impact strength and reduced die-swell properties.

What is claimed is:

1. A modified composition of a vinyl halide polymer comprising about 50 to 98 weight per cent poly (vinyl halide) and about 2 to 50 weight per cent of a multiphase acrylic composite interpolymer, said composite interpolymer comprising A. a first, elastomeric phase polymerized from a first monomer emulsion of at least about 50 weight per cent of at least one alkyl acrylate, wherein said alkyl group has about 2 to 8 carbon atoms, 0.05 to 5 weight per cent of polyethylenically unsaturated cross-linking monomer, 0 to 49.95 weight per cent of other acrylic monomer, and 0 to 20 weight per cent other copolymerizable ethylenically unsaturated monomer, said first phase having a $T_g$ below about 10°C.

B. a final, rigid thermoplastic phase polymerized in the presence of said elastomeric phase from a second monomer emulsion of at least about 40 weight per cent of at least one alkyl methacrylate, wherein said alkyl group has about one to four carbon atoms, 0 to 60 weight per cent of other acrylic comonomer and 0 to 60 weight per cent of non-acrylic ethylenically unsaturated comonomer, wherein said rigid thermoplastic phase has a molecular weight of from about 50,000 to 300,000, and a $T_g$ of at least about 20°C.

2. The composition of claim 1 wherein said alkyl acrylate of said elastomeric phase is n-butyl acrylate.

3. The composition of claim 1 wherein said alkyl acrylate is present in said first monomer emulsion in an amount of about 50 to 99.95 weight per cent.

4. The composition of claim 1 wherein said cross-linking monomer is present in said first monomer emulsion in an amount of about 0.1 to 3.5 weight per cent.

5. The composition of claim 1 wherein said other acrylic monomer is present in said first monomer emulsion in an amount of about 5 to 30 weight per cent.

6. The composition of claim 1 wherein said cross-linking monomer has at least two polymerizable ethylenically unsaturated reactive groups.

7. The composition of claim 6 wherein said reactive groups are non-conjugated.

8. The composition of claim 6 wherein said reactive groups are mediately conjugated.

9. The composition of claim 6 wherein said cross-linking monomer is selected from the group consisting of polyacrylic esters of polyols, polymethacrylic esters of polyols, vinyl acrylate, vinyl methacrylate, polyvinyl benzene, and mixtures thereof.

10. The composition of claim 1 wherein said other copolymerizable ethylenically unsaturated monomer is selected from the group consisting of styrene, alkyl methacrylates, olefins, vinyl ethers, vinyl esters, vinyl amides, vinyl halides, vinylidene halides, and mixtures thereof.

11. The composition of claim 1 wherein said alkyl methacrylate is methyl methacrylate.

12. The composition of claim 1 wherein said non-acrylic unsaturated comonomer imparting rigid character is selected from the group consisting of vinyl aromatics, vinyl halides, vinylidene halides, vinyl nitriles, and mixtures thereof.

13. The composition of claim 12, wherein said non-acrylic unsaturated comonomer imparting rigid character is selected from the group consisting of styrene and α-methyl-styrene.

14. The composition of claim 1 wherein said rigid thermoplastic phase has a molecular weight of about 100,000 to 250,000.

15. A modified composition of a vinyl halide polymer comprising about 50 to 98 weight per cent of a poly(vinyl halide) and about 2 to 50 weight per cent of a multi-phase acrylic composite interpolymer comprising (A) a first, elastomeric phase polymerized from a first monomer emulsion of 50 to 80 weight per cent n-butyl acrylate, 0.1 to 3.5 weight per cent of a cross-linking monomer having at least two polymerizable ethylenically unsaturated reactive groups, 0 to 30 weight per cent other copolymerizable acrylic monomer, and the balance, up to 20 weight per cent, other copolymerizable ethylenically unsaturated monomer, said first phase having a $T_g$ below about 10°C, and (B) a final, rigid thermoplastic phase polymerized in the presence of said elastomeric phase from a second monomer emulsion of about 40 to 100 weight per cent of methyl meth-acrylate, 0 to 60 weight per cent of non-acrylic ethylenically unsaturated comonomer imparting rigid character to said rigid thermoplastic phase selected from the group consisting of vinyl aromatics, vinyl halides, vinylidene halides, vinyl nitriles, and mixtures thereof, and 0 to 10 weight per cent other polymerizable ethylenically unsaturated comonomer, wherein said rigid thermo-plastic phase has a molecular weight of about 50,000 to 300,000 and a $T_g$ of at least about 20°C.

16. The composition of claim 15 wherein said reactive groups are non-conjugated.

17. The composition of claim 15 wherein said reactive groups are mediately conjugated.

18. The composition of claim 15 wherein said cross-linking monomer is selected from the group consisting of polyacrylic esters of polyols, polymethacrylic esters of polyols, vinyl acrylate, vinyl methacrylate, polyvinyl benzene, and mixtures thereof.

19. The composition of claim 15 wherein said other copolymerizable ethylenically unsaturated monomer is selected from the group consisting of styrene, alkyl methacrylates, olefins, vinyl ethers vinyl esters, vinyl amides, vinyl halides, vinylidene halides, and mixtures thereof.

20. The composition of claim 15 wherein said non-acrylic unsaturated comonomer imparting rigid character is selected from the group consisting of styrene and α-methyl styrene.

21. The composition of claim 15 wherein said rigid thermoplastic phase has a molecular weight of about 100,000 to 250,000, and a $T_g$ of at least about 50°C.

22. The composition of claim 15 wherein said rigid phase has a $T_g$ of at least about 90°C.

23. The composition of claim 15 wherein said elastomeric phase has a $T_g$ below about 0°C.

24. The composition of claim 15 wherein said elastomeric phase has a $T_g$ below about −30°C.

* * * * *